United States Patent Office 3,367,171
Patented Feb. 6, 1968

3,367,171
MELTING POINT MEASURING DEVICE
Tomio Kobayashi, 21-9 5-chome, Tsukagoshi,
Warabi-shi, Saitama-ken, Japan
Filed Mar. 25, 1965, Ser. No. 442,755
Claims priority, application Japan, Mar. 31, 1964,
39/24,801
6 Claims. (Cl. 73—17)

ABSTRACT OF THE DISCLOSURE

A device for determining the melting point of a sample of microscopic size in which the sample is deposited on a thermistor element through an opening in a cover plate above the thermistor element, the thermistor element being heated to in turn heat the sample until it melts, and the melting point is read on a calibrated meter connected to the thermistor element.

---

The present invention relates to a melting point measuring device, which utilizes a thermistor element, the thermal coefficient of which is more than 10 times larger than that of ordinary metallic resistors and wherein the resistance variation of the thermistor is measured directly. In the present device, microscopic specimens are directly placed on the thermistor element which is sensitive to temperature and connected with a meter (i.e. millivoltmeter) calibrated in temperature values, said thermistor element being adapted to sense the heater temperature whereas melting of the specimen is observed through a microscope. Thus the temperature at which melting occurs is indicated by the meter when melting of the specimen is observed.

In order that the present invention may be more clearly understood, it will now be described with reference to the accompanying drawings, in which.

Figure 1:
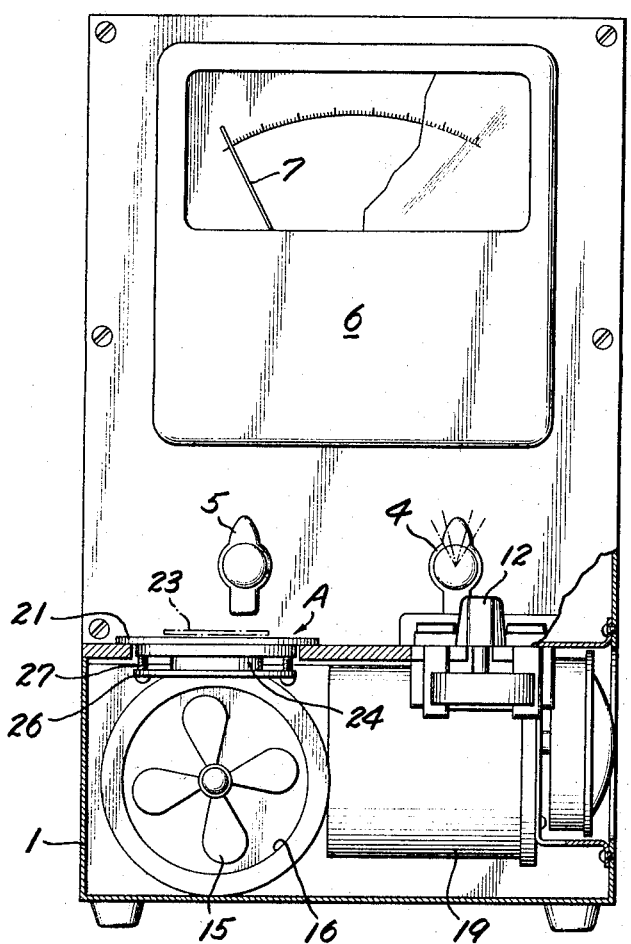
FIG. 1 is a partially broken front view of a melting point measuring device in accordance with the present invention.

Referring now to the drawings, the measuring device in accordance with the present invention includes a casing 1 which contains one or more dry batteries 2, said batteries 2 being connected with a temperature indicating meter 6 through a selector switch 4 and an adjusting switch 5. The selector switch 4 is adapted to connect or disconnect the batteries 2 from the circuit, and also is able to switch the meter circuit to a different stage so as to cause the pointer 7 of the meter 6 to correspond to temperature ranges of, for example, 0° C.–150° C. and 150° C.–300° C. etc. in accordance with the melting point of the specimen. The adjusting switch 5 is adapted to correct zero-adjustment of the pointer 7 of the meter 6. A thermistor element 8, which is connected with the selector switch 4 and indicates the temperature on the meter 6, is held in a heating and sensing portion A and is connected at its opposite terminals with the circuit of the meter 6. A heater 9 provided in the portion A and a motor 10 provided in the casing 1 are connected with a selector switch 12 mounted on the panel 11 of the casing 1, whereby when the switch 12 is turned counterclockwise, the heater indicator lamp is illuminated and the heater 9 is supplied with electric power, while when the switch 12 is turned clockwise, the motor indicator lamp is illuminated and the motor 10 is supplied with electric power. The cooling fan 15 of the motor 10 is enclosed in a duct 16 to which a baffle plate 17 is connected. The baffle plate 17 is curved toward the portion A and serves to guide cooling air forced from the fan 15 to the portion A. This quickly decreases the temperature of the thermistor element 8 and the heater 9 (200–100° C./104 sec.), and thus permits repeated use of the device. Further, since the heater 9 is connected with a voltmeter 18 and a variable resistor 19, the rate of temperature rise can be controlled as desired.

Figure 2:
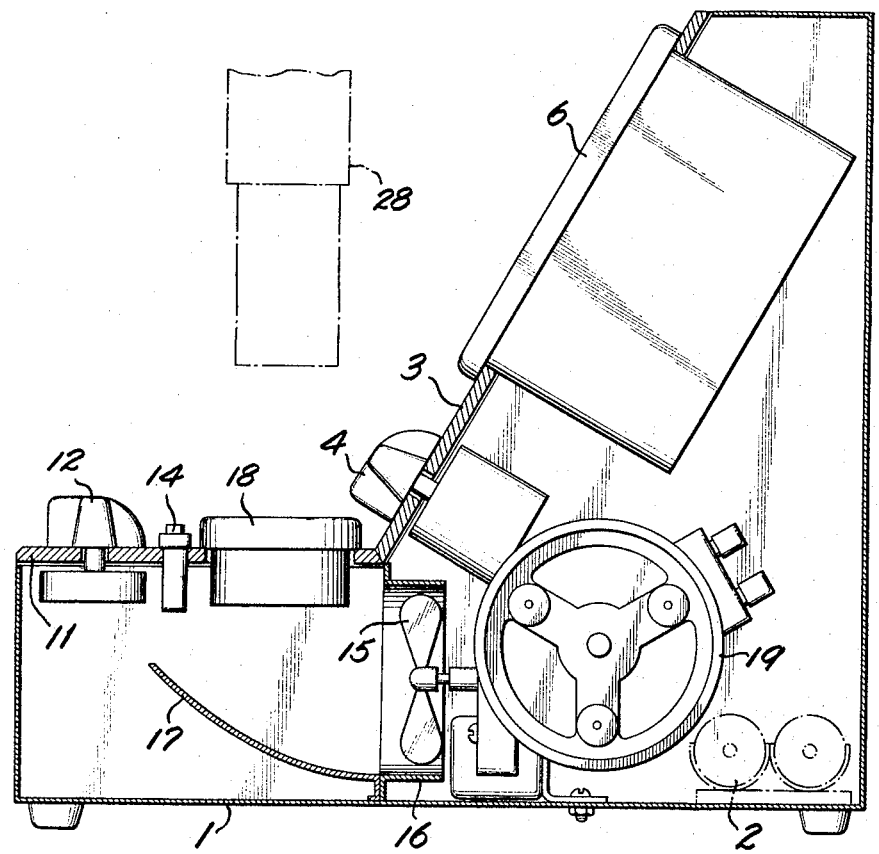
FIG. 2 is a longitudinal cross-section of the device shown in FIG. 1.
Figure 3:
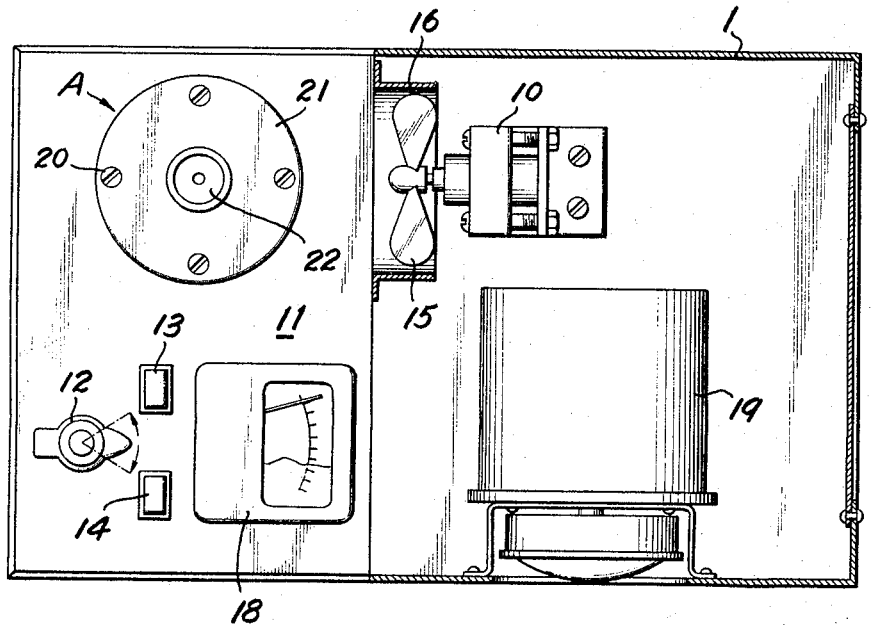
FIG. 3 is a partially broken plan view of the device shown in FIGS. 1 and 2.
Figure 4:
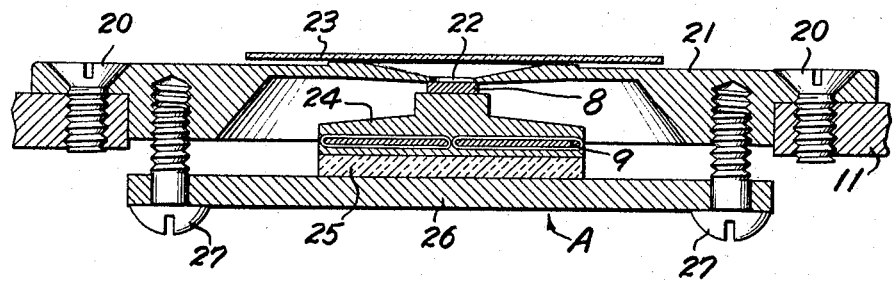
FIG. 4 is a cross-sectional view of the heating and sensing portion.

The heating and sensing portion A is provided above the thermistor element 8 with a cover 21 of corrosion resistant material such as stainless steel, nickel alloy, platinum alloy and the like. The cover 21 is secured on the panel 11 by means of screws 20, the cover 21 being formed at the center portion thereof with a hole 22 through which the element 8 is exposed. The cover 21 has a transparent plate 23 for example, glass on its upper surface to shield the interior of the hole 22 from the atmosphere so as to prevent temperature variation in the hole 22. Beneath the element 8, there is provided a support member 24 of copper, bronze, aluminum, duralmin or other heat conductive material. The support member 24 has heater 9 embedded therein, and an insulating board 25 of asbestos is arranged between the lower side of the support member 24 and a base plate 26 which is secured to the cover 21 by means of bolts 27. In FIG. 2, the numeral 28 shows a microscope located above the cover 21 and employed for observation of microscopic specimens.

In the operation of the device in accordance with the present invention, a microscopic specimen is inserted through the hole 22 and deposited directly on the thermistor element 8. Then, the transparent plate 23 is mounted on the cover 21, and when zero-adjustment of the pointer 7 of the meter 6 is completed by means of the switch 5, the switch 4 is actuated to complete a circuit connecting the meter and the batteries 2. After that, by turning the switch 12 clockwise, electric current is allowed to pass through the resistor 19 and the voltmeter 18 to the heater 9. Thus, the heater 9 is heated and the heat is transmitted through the heat conductive support member 24 to the thermistor element 8. The thermistor element 8, which is sensitive to temperature, quickly transmits the heat to the specimen and, at the same time, transmits its own temperature to the meter in the form of electrical resistance variation. The melting point can be detected by observing the specimen through the microscope 28 and reading the indication of the pointer 7 in the meter 6 when the specimen has started melting. When it is desired to repeat another test with other specimens, the switch 12 is turned counterclockwise completing a circuit for the motor 10 to cool the element 8 and the heater 9 rapidly.

In the present invention, the specimens are located directly on the thermistor element and heated therewith, and since the element has less thermal capacity and responds precisely without delay even to the small amount of temperature variation, the temperature rise of the thermistor element and that of the specimens will not lag in relation to that of the heater whereby precise measurement of the melting point can be obtained. Moreover since rapid heating can be performed, the time required for measurement can be substantially decreased. Further, since the measurement can be performed even with specimens of small amounts such as 0.5 mg.–1 mg., the device can be used in microscopic experiments requiring small amounts of specimens. Also, the present invention excludes the need for a liquid bath or the like, thus the measurement is accomplished completely in a dry condition which is effective for precise measurement of the melting point. Moreover, the device of the present invention has no undesirable vibrations due to liquid stirring or the like, thus the observation through the microscope is facilitated.

What I claim is:

1. A device for determining the melting point of a sample of microscopic size, said device comprising a support member of heat conductive material, heating means embedded in said support member, a thermistor element on said support member adapted for being connected with a meter calibrated to indicate the temperature of the thermistor element, said thermistor element having a substantially flat upper surface constituting a supporting surface for a sample the melting point of which is to be measured, and a cover plate above said thermistor element having an opening smaller than the extent of the thermistor and serving as a guide means for the placement of the sample on the thermistor element such that the sample is heated solely by the thermistor element.

2. A device as claimed in claim 1 wherein said support member includes a base portion in which the heating means is embedded, and an upper portion of reduced size compared to the base portion, said thermistor element resting on said upper portion.

3. A device as claimed in claim 2 wherein said base portion has a lower surface, the device comprising insulation means on the lower surface of said base portion whereby the heat evolved by the heating means is transferred to the thermistor element via said upper portion.

4. A device as claimed in claim 3 comprising a transparent plate freely placed on said cover plate to cover said opening therein and shield the sample from the atmosphere.

5. A device as claimed in claim 3 wherein said thermistor element is freely exposed beneath said cover plate, the device further comprising cooling means for supplying a cooling fluid beneath the cover plate to cool the thermistor element and the support member.

6. A device as claimed in claim 3 wherein said cover plate has an upper surface with an upwardly diverging conical cavity therein at said opening.

References Cited

UNITED STATES PATENTS

| 3,143,876 | 8/1964 | Wallgren | 73—17 |
| 3,250,115 | 5/1966 | Donnell | 73—17 |

FOREIGN PATENTS

| 141,461 | 4/1935 | Austria. |
| 959,250 | 5/1964 | Great Britain. |

OTHER REFERENCES

Prager, D. J., et al., "Freezing-Point Depression: New Method for Measuring Ultramicro Quantities of Fluids," in Science, 142 (3589), pp. 237–239, Oct. 11, 1963.

JAMES J. GILL, *Primary Examiner.*

J. C. GOLDSTEIN, E. E. SCOTT, *Assistant Examiners.*